United States Patent
Ura (10) Patent No.: US 7,367,706 B2
(45) Date of Patent: May 6, 2008

(54) ILLUMINATION UNIT AND LIQUID CRYSTAL DISPLAY COMPRISING IT

(75) Inventor: Toshihiko Ura, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 10/528,078

(22) PCT Filed: Sep. 19, 2002

(86) PCT No.: PCT/JP02/09595

§ 371 (c)(1),
(2), (4) Date: Aug. 30, 2005

(87) PCT Pub. No.: WO2004/027315

PCT Pub. Date: Apr. 1, 2004

(65) Prior Publication Data

US 2006/0104086 A1   May 18, 2006

(51) Int. Cl.
*F21V 7/04* (2006.01)
(52) U.S. Cl. .............. 362/632; 362/606; 362/609; 362/610; 362/615
(58) Field of Classification Search .......... 362/600, 362/26, 27, 632, 633, 631, 634, 606, 609, 362/610, 615; 349/58–67, 113
See application file for complete search history.

(56) References Cited

U.S. PATENT DOCUMENTS

| 5,929,950 | A | * | 7/1999 | Matsuda | 349/60 |
| 5,949,505 | A | * | 9/1999 | Funamoto et al. | 349/65 |
| 2004/0184284 | A1 | * | 9/2004 | Buelow et al. | 362/547 |
| 2005/0047111 | A1 | * | 3/2005 | Wu | 362/31 |
| 2005/0259443 | A1 | * | 11/2005 | Lin | 362/632 |
| 2006/0152944 | A1 | * | 7/2006 | Nakayoshi et al. | 362/631 |

FOREIGN PATENT DOCUMENTS

| JP | 04264488 | * | 9/1992 |
| JP | 5-41581 | | 2/1993 |
| JP | 2001-185867 | | 7/2001 |
| JP | 2001-216827 | | 8/2001 |
| JP | 2002-217343 | | 8/2002 |

* cited by examiner

*Primary Examiner*—Sandra O'Shea
*Assistant Examiner*—Mark Tsidulko
(74) *Attorney, Agent, or Firm*—McDermott Will & Emery LLP (57) ABSTRACT

A liquid crystal display device according to the present invention has a lighting unit (UT) comprising a light guiding plate (3), a light source (2), a reflector (4), a reflecting sheet (5) and a housing (10), and a liquid crystal display panel (1). In the liquid crystal display device, increase in temperature of the light source (2) is prevented by providing an opening portion (S1) on the housing (10) such that the opening portion (S1) reaches the reflector (4). In the liquid crystal display device, light emission intensity of the lighting unit (UT) is not lowered during operation of the device, and further, a lifetime of the light source (2) is not shortened.

1 Claim, 8 Drawing Sheets

ILLUMINATION UNIT AND LIQUID CRYSTAL DISPLAY COMPRISING IT

TECHNICAL FIELD

The present invention relates both to a lighting unit and to a liquid crystal display device using the same.

BACKGROUND ART

A liquid crystal display device characterized by extremely small power consumption has been widely used as an image display device mounted on an image device of an information device such as a notebook-type personal computer, a word processor and the like, or as an image device of a video device such as a portable television, a video movie, a car navigation system and the like, for securing sufficient operating time of the image device, because these image devices are often driven by built-in primary or secondary battery. As used herein, the liquid crystal display device refers to a device comprising, for example, a liquid crystal display panel structured such that two transparent glass substrates on which driving signal supplying electrodes formed by electrically conductive transparent thin films, alignment layers and the like are stacked, are superposed on each other with a predetermined spacing so that the surfaces of the stack are opposed to each other, and sealed after liquid crystal is filled therebetween, and polarizers are provided on outside of both the glass substrates, and configured to display an image by variation of transmissivity of light according to a driving signal inputted to the driving signal supplying electrode, a lighting unit disposed behind the liquid crystal display panel for supplying light to the liquid crystal display panel, and a circuit board and the like for driving the liquid crystal display panel.

Figure 8:
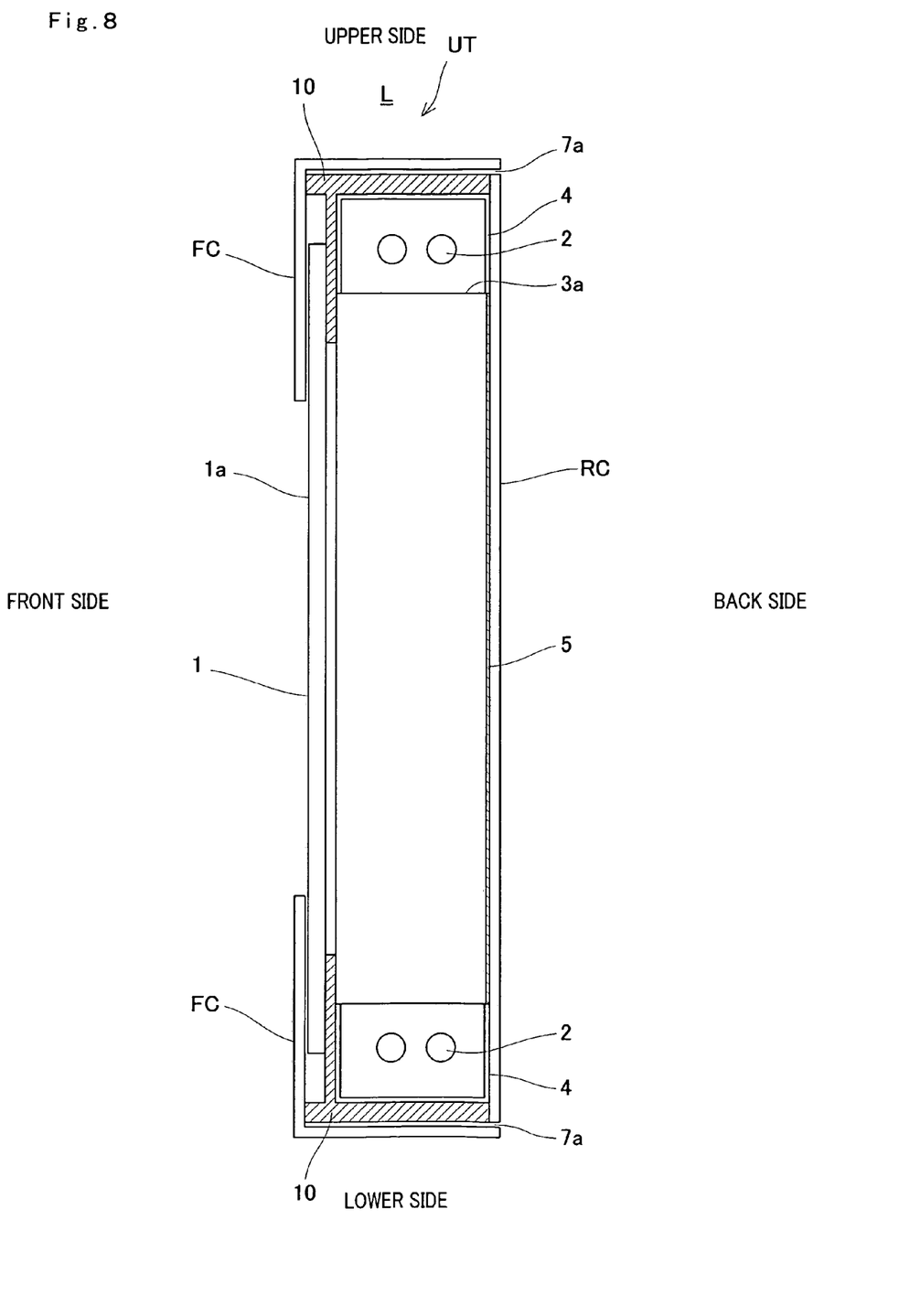
FIG. 8 is a cross-sectional view showing a structure of a liquid crystal display device using a conventional edge light type lighting unit.

FIG. 8 is a cross-sectional view showing an example of the liquid crystal display device comprising a conventional edge light type lighting unit. As a matter of convenience, a direction of the liquid crystal display device is shown as in the drawing. A liquid crystal display device L comprises a liquid crystal display panel 1 disposed such that a display surface 1a on which characters and images are displayed faces forward, front side frames FC formed by molding metal plates having a constant thickness into L-shape and disposed to cover a non-display display region of the display surface 1a of the liquid crystal display panel 1 with a predetermined spacing between the same and the liquid crystal display panel 1 and to form upper and lower surfaces of the end face of the liquid crystal display device L, a lighting unit UT disposed behind the liquid crystal display panel 1 for supplying light to the liquid crystal display panel, and a rear cover RC disposed to cover an entire rear surface of the lighting unit UT.

Herein, the lighting unit UT comprises a light guiding plate 3 formed by a transparent plate made of synthetic resin such as acrylic for guiding light entering from an end face thereof in a direction parallel to a principal surface thereof and emanating the light from the principal surface thereof, light sources 2 such as fluorescent discharge tubes disposed in the vicinity of end faces 3a of the light guiding plate 3 in a direction substantially parallel to the end faces 3a along the end faces 3a, reflectors 4 covering the light sources 2 in U-shape over a substantially entire length thereof, a reflecting sheet 5 formed by a white synthetic resinous sheet or the like having a high reflectivity for reflecting the light emanated from a rear principal surface of the light guiding plate 3 toward the light guiding plate 3 again, and housings 10 made of policarbonate resin or the like for supporting the reflectors 4 and the light guiding plate 3 at upper, lower, and front surfaces of the reflectors 4 and an outer peripheral portion of a front principal surface of the light guiding plate 3, fixing the liquid crystal display panel 1 and the light guiding plate 3 with a predetermined spacing, and fixing front side frames FC to predetermined positions so as to form gaps 7a.

In the liquid crystal display device L structured as described above, light emitted from the light source 2 is efficiently introduced into the end face 3a of the light guiding plate 3 by means of the reflector 4, and the light introduced into the end face 3a of the light guiding plate 3 is guided in the direction away from the light source 2 by means of the light guiding plate 3, and uniformly emanated from a front side of the light guiding plate 3 by being reflected by means of the reflecting sheet 5, and the emanated light enters the liquid crystal display panel 1. And, images are displayed on the liquid crystal display panel 1 by variation of transmissivity of light according to the driving signal inputted to the driving signal supplying electrodes.

In a meanwhile, recently, the liquid crystal display device mounted on the image device so as to obtain a light and thin image device has been required to be light and thin. And, the liquid crystal display device used in the image device such as a monitor is required to obtain high luminance in addition to lightness and thinness. Furthermore, a screen thereof becomes larger. In response to such a trend, a liquid crystal display device using the edge light type lighting unit in which a tubular light source such as a fluorescent discharge tube is disposed on an end face thereof, which is suitable for obtaining lightness and thinness, high luminance, and a large screen, is widely used.

On the other hand, the liquid crystal display device is characterized in that light emission intensity of the light source lowers with elapse of time and a lifetime of the light source becomes short when a temperature in the vicinity of the light source becomes high by heat generated from the light source located within the lighting unit. Therefore, it is required to cool down the vicinity of the light source, or to secure a path for discharging the heat in the vicinity of the light source so as to hold a luminance of the liquid crystal display device constant during operation of the device, and to prevent occurrence of negative effects on the lifetime of the light source.

However, in the liquid crystal display device using the lighting unit of the conventional edge light type, since the light source is covered with the reflector, the housing, the rear cover and the like, there is a problem that the temperature in the vicinity of the light source becomes high by heat generated from the light source during operation of the device. And, if a cooling device is provided in the vicinity of the light source for cooling down the vicinity of the light source, a size of the liquid crystal display device becomes large with an additional volume of the cooling device, so that it becomes difficult to obtain the light and thin image device. Furthermore, since power consumption of the entire image device increases by providing the cooling device, a load on built-in primary or secondary battery increases, thereby causing a problem that securement of sufficient operating time of image device, which is an original object, is inhibited.

DISCLOSURE OF THE INVENTION

The present invention is aimed at solving the above-described problem. And, an object of the present invention is to provide a lighting unit capable of keeping a luminance of a liquid crystal display device constant during operation of the device, and inhibiting negative effects on a lifetime of a light source, by forming a path on the lighting unit for releasing heat emitted from the light source, and by releasing the heat emitted from the light source during operation of the liquid crystal display device outside the liquid crystal display device, and a liquid crystal display device using the same.

In order to achieve the above object, according to the present invention, there is provided a lighting unit comprising a light guiding plate for guiding light entering from an end face thereof along a principal surface thereof, a light source disposed along the end face of the light guiding plate, a reflector enclosing the light source and configured to reflect the light emitted from the light source toward the end face of the light guiding plate, and a housing disposed to enclose at least the reflector, wherein an opening portion is formed to penetrate the housing toward the reflector.

In such a structure, since the heat emitted from the light source can be released outside the liquid crystal display device through the opening portion provided on the housing, and thereby a temperature in the vicinity of the light source does not rise up to a high temperature, it is possible to inhibit light emission intensity of the light source from lowering with elapse of time, and a lifetime thereof from becoming short.

In this case, a concave portion or a convex portion may be formed on the housing, and the opening portion may be formed on at least one of side surfaces of the concave portion or the convex portion.

In the structure as described above, the housing is provided with a bent portion formed by inwardly bending a predetermined region at a point of an outer periphery thereof and by cutting a remaining portion of the predetermined region, and a step portion formed by the bent portion forms the opening portion.

In such a structure, also, since the heat emitted from the light source can be released outside the liquid crystal display device through the opening portion provided on the housing, and thereby the temperature in the vicinity of the light source does not rise up to a high temperature, it is possible to inhibit the light emission intensity of the light source from lowering with elapse of time, and the lifetime thereof from becoming short.

And, the lighting unit according to the present invention comprises a light guiding plate for guiding light entering from an end face thereof along a principal surface thereof, a light source disposed along the end face of the light guiding plate, a reflector enclosing the light source and configured to reflect the light emitted from the light source toward the end face of the light guiding plate, and a housing disposed to enclose at least the reflector, wherein the housing is made of insulative and thermally conductive resin.

In such a structure, since the heat emitted from the light source can be released outside the liquid crystal display device by thermal conductivity of the housing, and thereby the temperature in the vicinity of the light source does not rise up to a high temperature, it is possible to inhibit the light emission intensity of the light source from lowering with elapse of time, and the lifetime thereof from becoming short.

And, a liquid crystal display device according to the present invention comprises a lighting unit according to claim 1 or 4, and a liquid crystal display panel configured to display an image by variation of transmissivity of light according to an inputted image signal, wherein the liquid crystal display panel is disposed on a front surface of the lighting unit.

In such a structure, it is possible to obtain the liquid crystal display device in which a luminance thereof is kept constant during operation of the device, and a lifetime characteristic of the light source is improved.

The object, as well as other objects, features and advantages of the present invention will become more apparent from the following detailed description of the preferred embodiments taken with reference to the accompanying drawings.

BEST MODE FOR CARRYING OUT THE INVENTION

Hereinafter, embodiments of the present invention will be described with reference to the drawings.

FIRST EMBODIMENT

A first embodiment of the present invention shows a first example of a configuration of a lighting unit capable of releasing heat emitted from a light source outside a liquid crystal display device through a reflector and an opening portion provided on a housing, and of the liquid crystal display device using the same.

Figure 1:
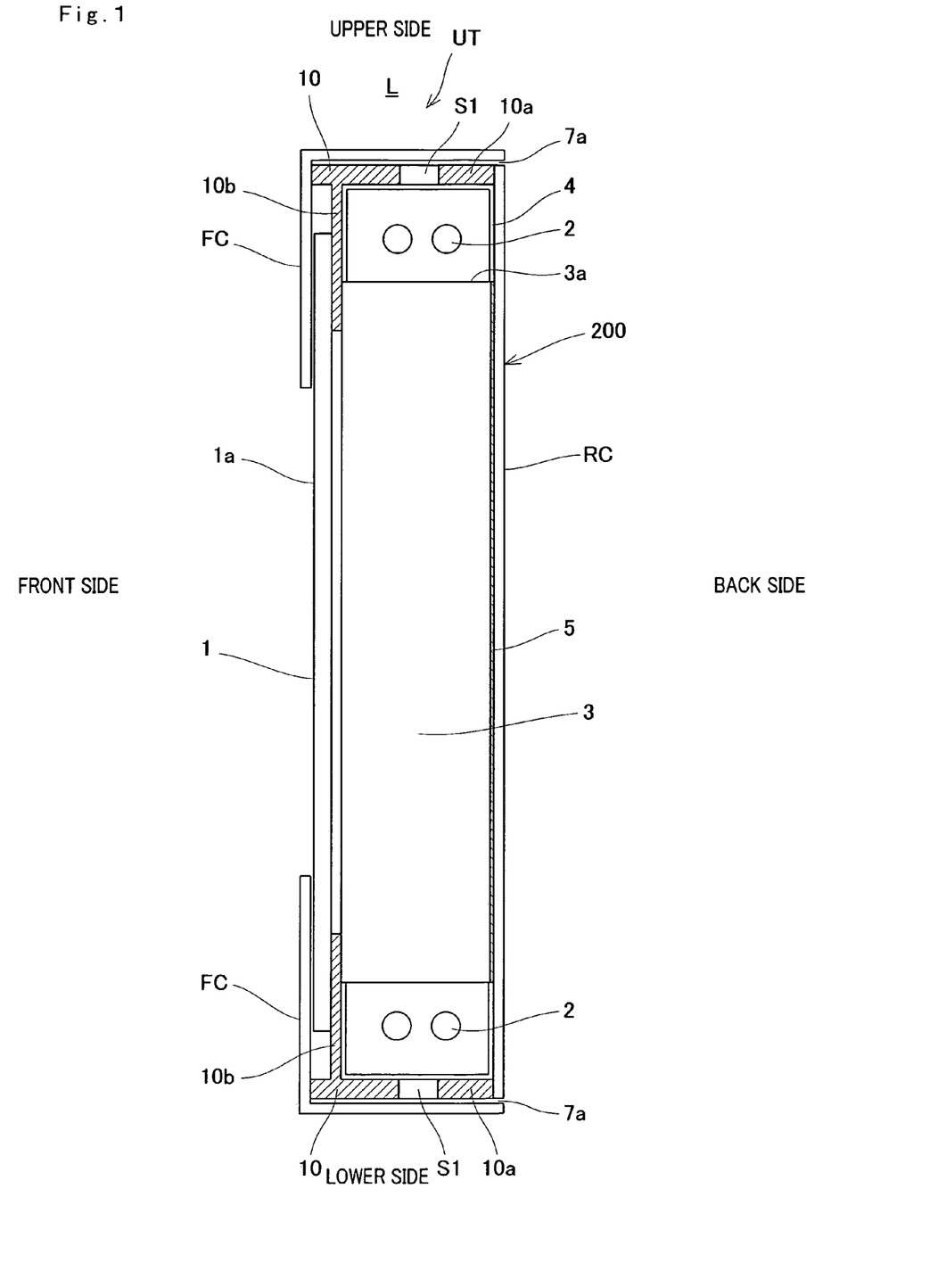
FIG. 1 is a cross-sectional view schematically showing a structure of a liquid crystal display device according to a first embodiment of the present invention.

FIG. 1 is a cross-sectional view schematically showing the lighting unit and the liquid crystal display device using the same according to the present embodiment.

A liquid crystal display device L comprises a pair of housings 10 disposed to be opposed to each other in a vertical direction. The housing 10 includes a rectangular plate-shaped body 10*a* horizontally disposed, and a rectangular plate-shaped separating wall portion 10*b* extending in a vertical direction from a position spaced a predetermined distance apart from and behind a front end of the body 10a. A rectangular rear cover RC is disposed on rear ends of the bodies 10a of the pair of housings 10 and, the pair of housings 10 and the rear cover RC form a casing 200. Therefore, a rear wall and side walls of the casing 200 are formed by the rear cover RC and the pair of housings 10 respectively. A rectangular flat-plate-shaped light guiding plate 3 is disposed at the center of a space enclosed with the rear cover RC, and the bodies 10a and the separating wall portions 10b of the housings 10. The light guiding plate 3 is disposed such that upper and lower end portions of a front surface thereof contact the separating wall portions 10b of the housings 10, and a reflecting sheet 5 is disposed between a rear surface of the light guiding plate 3 and the rear cover RC. And, two light sources 2 such as fluorescent discharge tubes are disposed to extend along upper and lower end faces of the light guiding plate 3 in a right-left direction thereof. And, reflectors 4 are each disposed to enclose the two light sources 2. Herein, the reflector 4 has a U-shaped cross section, and is disposed such that tip ends thereof contact an end face of the light guiding plate 3 and an end face of the reflecting sheet 5, and an outer surface thereof contacts the rear cover RC, and the body 10a and the separating wall portion 10b of the housing 10. Thereby, the light guiding plate 3 and the reflectors 4, 4 are held by the casing 200 (the rear cover RC and the body 10a and the separating wall portion 10b of the housing 10).

And, a liquid crystal display panel 1 is disposed on a front surface of the separating wall portions 10b of the pair of housings 10. The liquid crystal display panel 1 is fixed to the housings 10 by a fixing means not shown. A distance between the separating wall portion 10b and the front end of the body 10a of the housing 10 is set substantially equal to a thickness of the liquid crystal display panel 1. And, a pair of front side frames FC each having an L-shaped cross section are disposed to cover upper and lower end portions of the front surface of the liquid crystal display panel 1, and outer surfaces of the bodies 10a of the pair of housings 10. The front side frames FC are disposed to have a minute spacing between the same and the liquid crystal display panel 1 and have a predetermined gap 7a between the same and the bodies 10a of the housings 10.

Opening portions S1, which are, for example, circular through-holes are provided on the bodies 10a of the housings 10.

In the liquid crystal display device L structured as described above, the light source 2 is driven by a high-frequency alternating current of 40 to 100 kHz to emit light, and light emitted from the light source 2 is introduced into an end face 3a of the light guiding plate 3 by means of the reflector 4 formed by a resinous film having a high reflectivity and a metal film made of silver, aluminum or the like. The light introduced into the end face 3a of the light guiding plate 3 is guided in the direction away from the light source 2 by means of the light guiding plate 3, and is uniformly emanated from a front side of the light guiding plate 3 by being reflected by means of the reflecting sheet 5 formed by a resinous film having a high reflectivity, and, the emanated light enters the liquid crystal display panel 1. And, images are displayed by variation of transmissivity of light according to a driving signal inputted to a driving signal supplying electrodes.

Next, an effect of the present embodiment will be described. In an edge light type lighting unit UT, the housing 10 is typically made of an insulative resinous material (i.e., a thermal insulating material), for insulating the light source 2 from outside in consideration of safety. So, during operation of the liquid crystal display device L, heat emitted from the light source 2 disposed within the lighting unit UT is confined in the vicinity of the light source 2 by the reflector 4 and the end face 3a of the light guiding plate 3. Therefore, the light source 2 is finally in a high temperature condition corresponding to power consumption thereof, and when the light source 2 is kept in the high temperature condition, light emission intensity thereof is lowered with elapse of time, and a lifetime thereof becomes short.

The reflector 4 is required to be cooled down to keep a luminance of the liquid crystal display device L constant during operation of the device, and to prevent negative effects on the lifetime of the light source 2. However, if a cooling device is provided in the vicinity of the reflector 4 for cooling down the same, a size of the liquid crystal display device L increases with an additional volume of the cooling device. So, it becomes difficult to obtain a light and thin image device. And, since power consumption of the entire image device increases by providing the cooling device, a load on built-in primary or secondary battery increases, thereby causing a problem that securement of sufficient operating time of the image device, which is an original object, is inhibited.

As shown in FIG. 1, the opening portions S1 which are, for example, circular, are formed on the housings 10 so as to penetrate toward the reflectors 4. In this case, since the opening portion S1 and an outside of the liquid crystal display device L communicate with each other as the same airspace through a gap 7a, heat of the reflector 4 may be released from a surface thereof outside the liquid crystal display device L through the opening portion S1 and the gap 7a. In addition, the heat of the reflector 4 may be transmitted from the surface thereof to the front side frame FC through the opening portion 51 and the gap 7a, and released outside the liquid crystal display device L through the front side frame FC. Therefore, when heat is emitted from the light source 2, the reflector 4 has a temperature under the condition in which heating by the heat emitted from the light source 2 and heat radiation through the opening portion S1 and the gap 7a are balanced. This may be considered as a phenomenon in which a part of the heat emitted from the light source 2 move to the opening portion S1 through the reflector 4, and is released outside the liquid crystal display device L through the gap 7a and the like.

Consequently, a temperature of the light source 2 does not rise up to a temperature corresponding to the power consumption thereof, and the light emission intensity of the light source 2 is kept constant. Therefore, it becomes possible to keep the luminance of the liquid crystal display device L constant. In addition, it becomes possible to prevent negative effects on the lifetime of the light source 2.

A shape of the opening portion S1 is not limited to a circle, and a size thereof is not limited. Also, the number of the opening portion S1 is not limited. The opening portion S1 may be provided on any portion of the body 10a, and distribution thereof is not limited to a line shape.

SECOND EMBODIMENT

A second embodiment of the present invention shows a second example of the configuration of the lighting unit capable of releasing heat emitted from the light source outside the liquid crystal display device through the reflector and the opening portion provided on the housing, and of the liquid crystal display device using the same.

Figure 2:
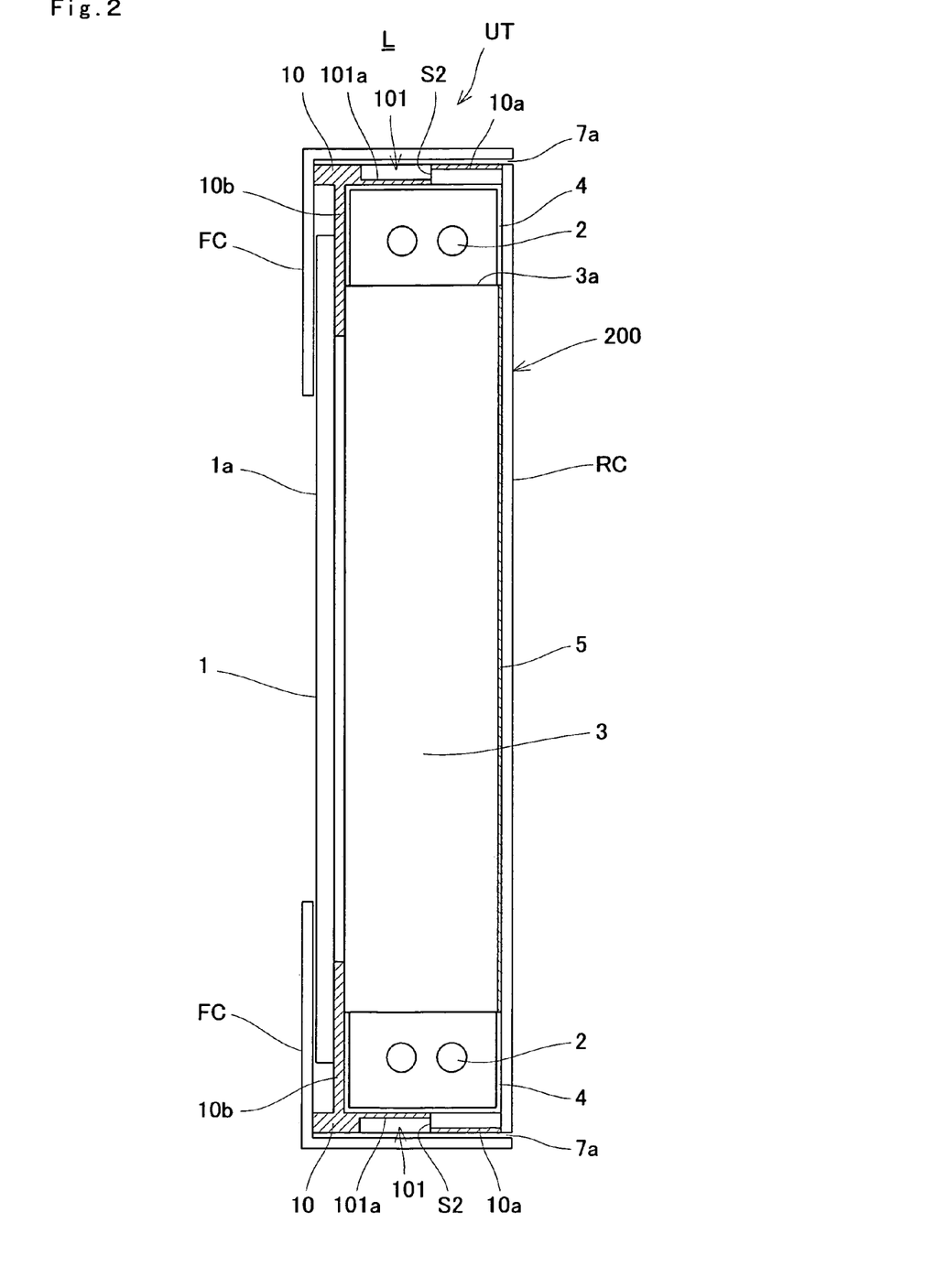
FIG. 2 is a cross-sectional view schematically showing a structure of a liquid crystal display device according to a second embodiment of the present invention.
Figure 3:
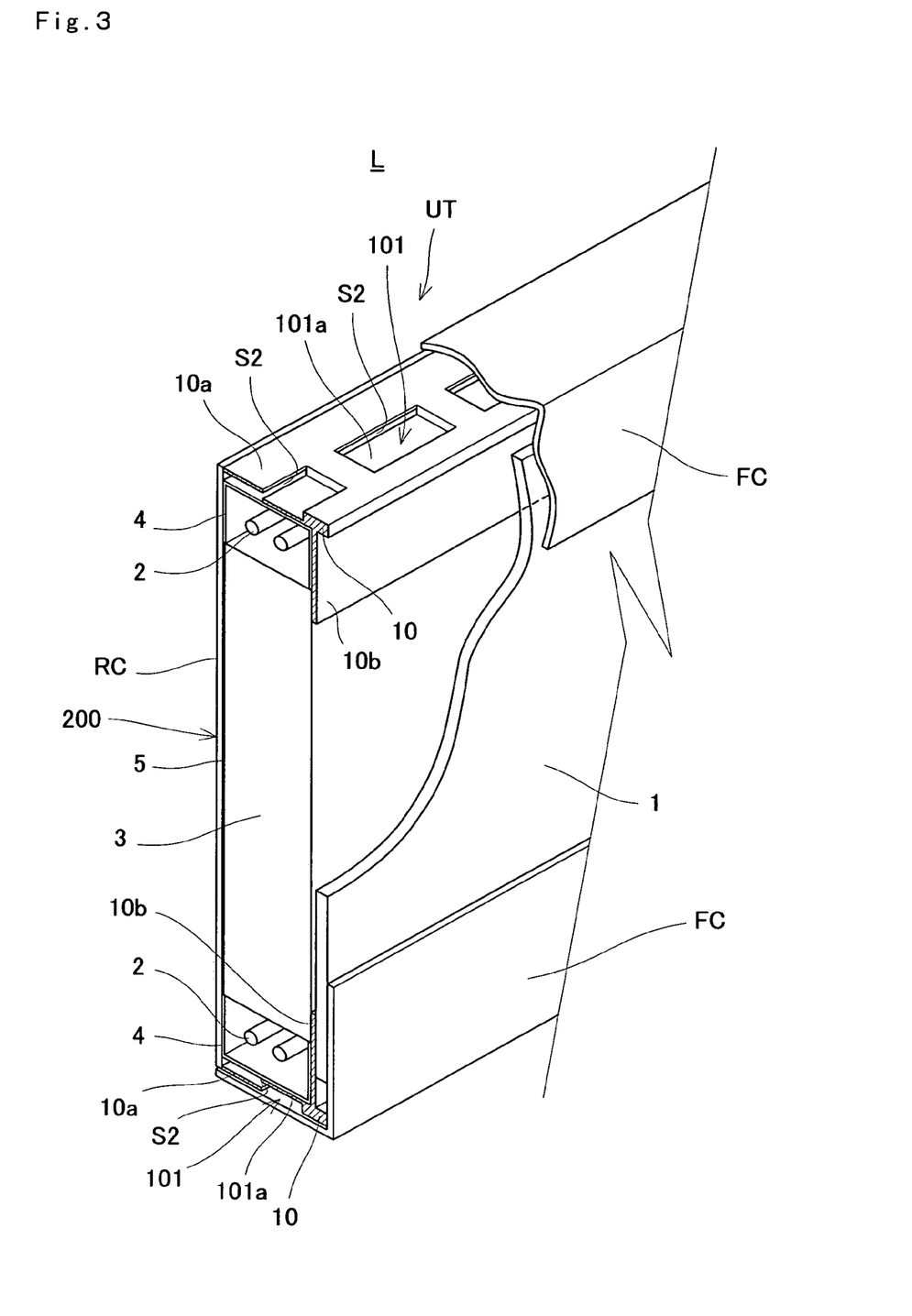
FIG. 3 is a cross-sectional perspective view schematically showing the structure of the liquid crystal display device according to the second embodiment of the present invention.

FIG. 2 is a cross-sectional view schematically showing the lighting unit and the liquid crystal display device using the same according to the present embodiment. FIG. 3 is a cross-sectional perspective view schematically showing the lighting unit and the liquid crystal display device using the same according to the present embodiment.

In FIGS. 2 and 3, the same reference numerals as those in FIG. 1 denote same or corresponding parts.

In the present embodiment, as shown in FIGS. 2 and 3, the body 10a of the housing 10 is thinly formed, and concave portions 101 are formed on the body 10a in a longitudinal (right-left) direction of the housing 10 at a predetermined pitch. One end of each of the concave portions 101 formed on both end portions of the housing 10 is opened. Opening portions S2 are provided on part (herein, rear portions) of side walls (step surfaces) of the concave portions 101. And, bottom walls 101a of the concave portions 101 contact an end face of the reflector 4, and thereby the reflector 4 is positioned in a vertical direction. Otherwise, this embodiment is similar to the first embodiment.

In such a structure as described above, as in the first embodiment, since the temperature of the light source does not rise up to the temperature corresponding to the power consumption thereof, the light emission intensity of the light source is kept constant, and therefore it becomes possible to keep the luminance of the liquid crystal display device constant, and to prevent negative effects on the lifetime of the light source. And, increase in dimension of the lighting unit UT in the vertical direction caused by providing the concave portion 101 can be inhibited by thinly forming the body 10a of the housing 10. Furthermore, since an opening size of the opening portion S2 is small, it is possible to inhibit dust outside the liquid crystal display device or the like from adhering to the reflector.

A shape of the concave portion 101 is not limited to a rectangle. And, the opening portion S2 may be provided on any portion of the side wall of the concave portion 101. In addition, distribution of the concave portions 101 is not limited to a line shape.

Although the concave portion is provided on the body 10a of the housing 10 in the present embodiment, a convex portion may be provided instead of the concave portion. Hereinafter, an alternative example of the lighting unit and the liquid crystal display device using the same of the present embodiment, in which the convex portions are provided on the body 10a of the housing 10 will be described with reference to FIGS. 4 and 5.

Figure 4:
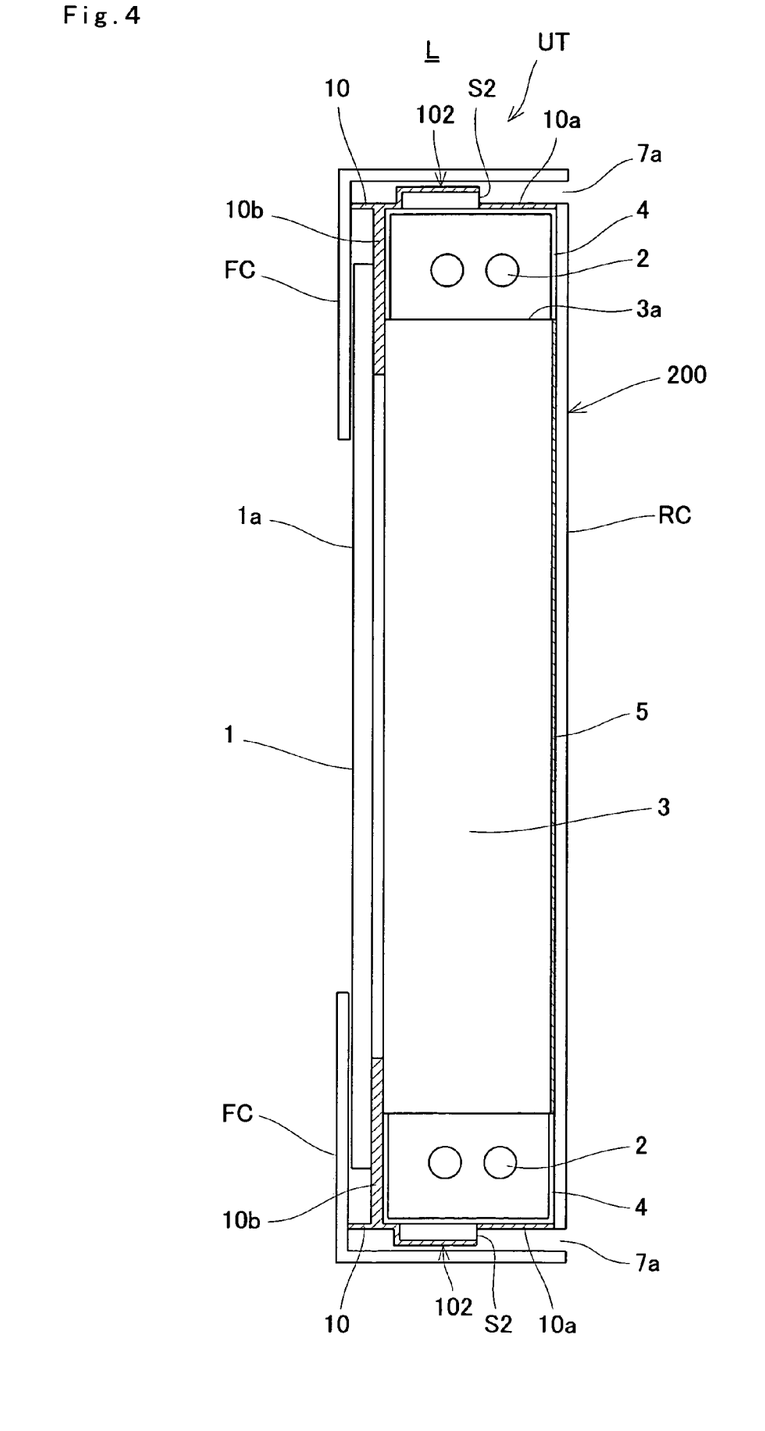
FIG. 4 is a cross-sectional view schematically showing alternative structure of the liquid crystal display device according to the second embodiment of the present invention.

FIG. 4 is a cross-sectional view schematically showing an alternative example of the lighting unit and the liquid crystal display device using the same according to the present embodiment. And, FIG. 5 is a cross-sectional perspective view schematically showing the alternative example of the lighting unit and the liquid crystal display device using the same according to the present embodiment.

Figure 5:
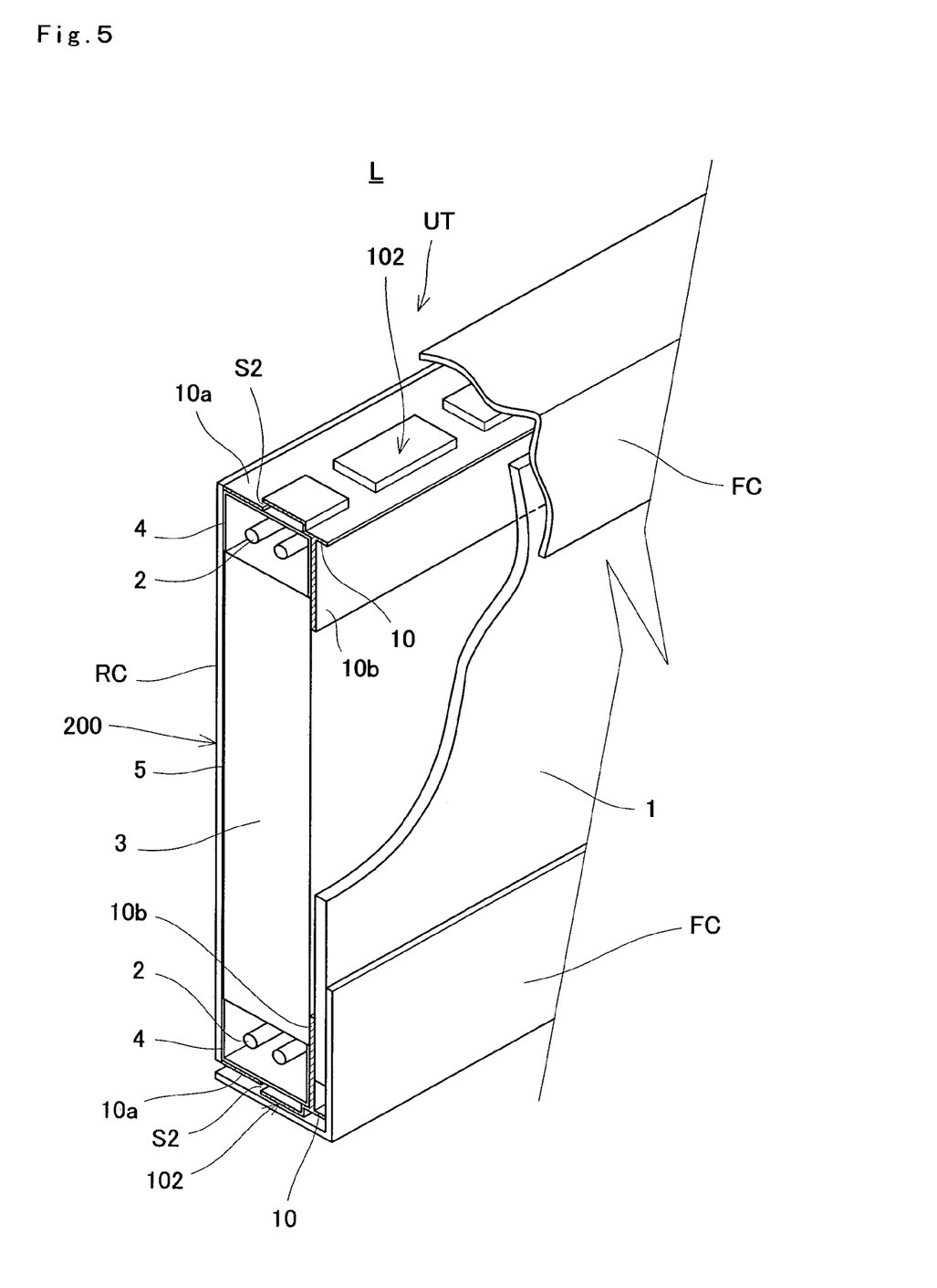
FIG. 5 is a cross-sectional perspective view schematically showing alternative structure of the liquid crystal display device according to the second embodiment of the present invention.

In FIGS. 4 and 5, the same reference numerals as those in FIG. 1 denote same or corresponding portions.

In the alternative example of the lighting unit according to the present embodiment, as shown in FIGS. 4 and 5, the body 10a of the housing 10 is thinly formed, and convex portions 102 are formed on the body 10a in a longitudinal (right-left) direction of the housing 10 at a predetermined pitch. One end of each of the convex portions 102 formed on both end portions of the housings 10 is opened. The opening portion S2 is provided on a portion (herein, rear side portion) of a side wall (step surface) of the concave portion 102. And, the body 10a of the housing 10 contacts the end face of the reflector 4, and thereby the reflector 4 is positioned in the vertical direction. Otherwise, this example is similar to the present embodiment.

In such a structure also, the same effect as in the present embodiment can be obtained.

A shape of the convex portion 102 is not limited to a rectangle. And, the opening portion S2 may be provided on any portion of the side wall of the convex portion 102. And, distribution of the convex portions 102 is not limited to a line shape.

THIRD EMBODIMENT

A third embodiment of the present invention shows a third example of the configuration of the lighting unit capable of releasing heat accumulated in the vicinity of the light source outside the liquid crystal display device through the reflector, and of the liquid crystal display device.

Figure 6:
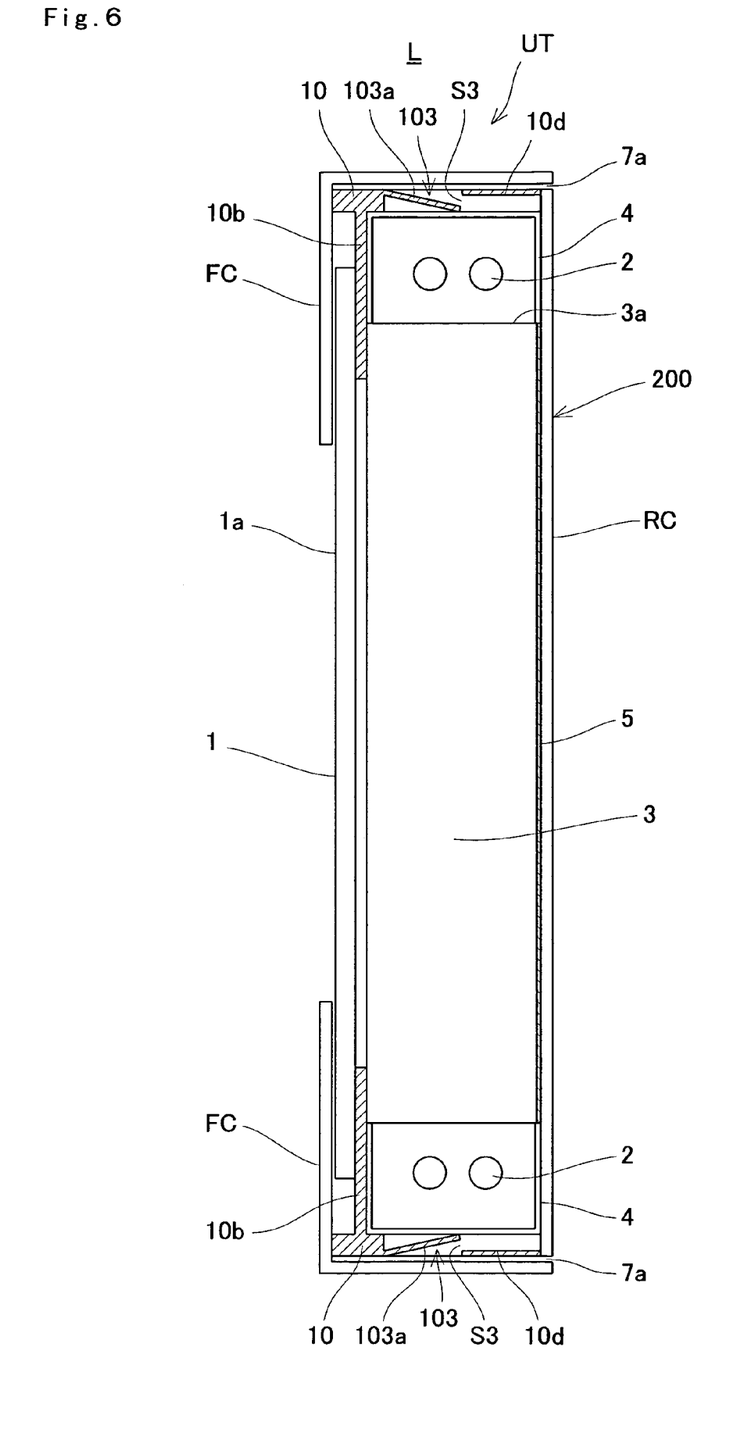
FIG. 6 is a cross-sectional view schematically showing a structure of a liquid crystal display device according to a third embodiment of the present invention.

FIG. 6 is a cross-sectional view schematically showing the lighting unit and the liquid crystal display device using the same according to the present embodiment. And FIG. 7 is a cross-sectional perspective view schematically showing the lighting unit and the liquid crystal display device using the same according to the present embodiment.

Figure 7:
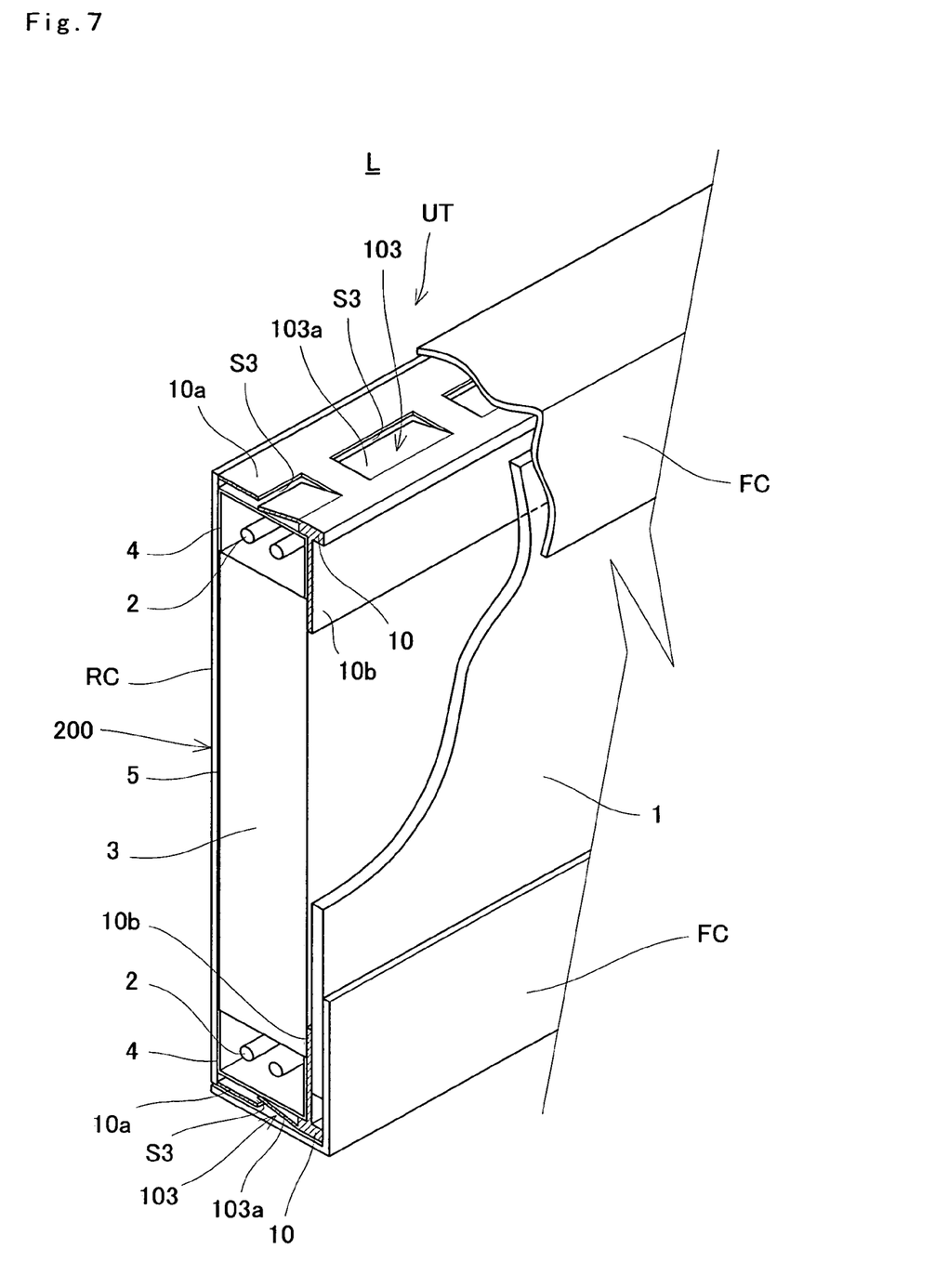
FIG. 7 is a cross-sectional perspective view schematically showing the structure of the liquid crystal display device according to the third embodiment of the present invention.

In FIGS. 6 and 7, the same reference numerals as those in FIG. 1 denote same or corresponding portions.

In the present embodiment, as shown in FIGS. 6 and 7, a predetermined region (hereinafter, referred to as an opening forming region) 103 of the body 10a of the housing 10 is inwardly bent at an end of a side wall (hereinafter, referred to as a bent portion) within the opening forming region 103 so as to be cut from other portion thereof, and thereby, an opening portion S3 is formed between a periphery of the bent portion 103a and the other portion of the opening forming region 103. And, a tip end of the bent portion 103a contacts the end face of the reflector 4, and thereby, the reflector 4 is positioned in the vertical direction. Otherwise, this embodiment is similar to the second embodiment.

In such a structure also, the same effect as in the second embodiment can be obtained.

Although, in the above-described first to third embodiments, the liquid crystal display panel and the liquid crystal display device are used as an image display element and an image display device, respectively, other element and device may be used.

And, although opening portions S1, S2, and S3 are provided on the housing 10 in the above-described first to third embodiments, the housing 10 may be made of a resin material which is excellent in thermal insulation and thermal conductivity. Thereby, the temperature in the vicinity of the light source 2 can also be lowered. An example of such resin material is high-density polyethylene (thermal conductivity: 0.6 W/m·K) or the like which is thermoplastic resin.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the sprit of the invention.

INDUSTRIAL APPLICABILITY

A lighting unit according to the present invention is useful as a lighting unit of a consumer and industrial liquid crystal display device, a display portion of which is required to be thin.

A liquid crystal display device according to the present invention is useful as an image display device of an information device such as a consumer and industrial notebook-type personal computer, word processor or the like, or of a portable television, a video movie, a car navigation system or the like and the like, a display portion of which is required to be thin.

The invention claimed is:

1. A lighting unit comprising:
    a light guiding plate for guiding light entering from an end face thereof along a principal surface thereof;
    a light source disposed along the end face of the light guiding plate;
    a reflector enclosing the light source and configured to reflect the light emitted from the light source toward the end face of the light guiding plate; and
    a housing disposed to enclose at least the reflector, wherein an opening portion is formed to penetrate the housing toward the reflector, the housing is provided with a bent portion formed by inwardly bending a predetermined region at a point of an outer periphery thereof and cutting a remaining portion of the predetermined region, and a step portion formed by the bent portion forms the opening portion.

* * * * *